United States Patent Office 2,886,538
Patented May 12, 1959

2,886,538

PHOSPHORUS CONTAINING AZIRIDINYL-ALCOHOL POLYMERS AND FLAME RESISTANT ORGANIC TEXTILES

Leon H. Chance, George L. Drake, Jr., and Wilson A. Reeves, New Orleans, La., assignors to the United States of America as represented by the Secretary of Agriculture No Drawing. Application June 5, 1956
Serial No. 589,561

10 Claims. (Cl. 260—2)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to new phosphorus and nitrogen containing polymers, processes for their production and process of employing these polymers in the flameproofing of certain organic fibrous materials.

In general, this invention relates to polymers capable of being produced by the reaction of a 1-aziridinyl phosphine oxide or sulfide (e.g. a compound that contains at least two 1-aziridinyl groups,

attached to pentavalent phosphorus), with a polyhydric alcohol of the formula $(HO)_xR$ where $x$ is an integer of two or more and R is an alkyl or aryl group.

We have discovered that compounds that contain at least two 1-aziridinyl groups attached to pentavalent phosphorus atoms react with alcoholic compounds (e.g. compounds that contain at least two HO groups) to produce polymers. Such polymers contain the reoccurring connecting structures

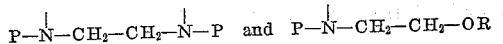

wherein the phosphorus atoms are pentavalent and OR is an alkoxy group.

Such polymers can be produced in the form of solid synthetic resins. They can be deposited on the surfaces and/or in the interstices of hydrophilic fibrous organic materials, i.e., organic materials which absorb or adsorb water. When such resins are deposited, they reduce the combustibility of hydrophilic fibrous organic materials and resist removal by laundering and the like chemical treatments. Such resins can be deposited on the surfaces of non-hydrophilic materials to form flame resistant coatings.

1-aziridinyl phosphine oxides or sulfides suitable for use in this invention are compounds which contain at least two 1-aziridinyl groups, $(CH_2)_2N$—, attached to pentavalent phosphorus atoms. The compounds used in this invention may be represented by the following structure:

wherein

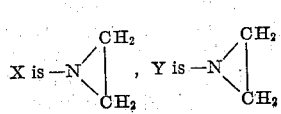

or a dialkyl amine group such as

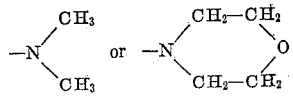

and where Z is oxygen or sulfur. The aziridinyl compounds can be prepared by substantially any of the known processes for producing such compounds. In general, they are prepared by reacting ethylenimine or carbon substituted ethylenimines with the corresponding phosphorus halide. The preparation of tris(1-aziridinyl)-phosphine oxide $[(CH_2)_2N]_3PO$, has been described by Bestian and coworkers [Bestian et al., Ann. 566, 210–244 (1950)].

Other aziridinyl compounds that undergo reaction described herein consist of compounds or polymers containing the following structures:

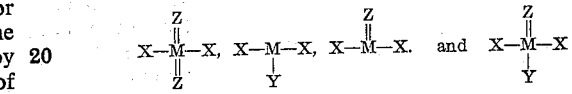

where Z is oxygen, sulfur or nitrogen;

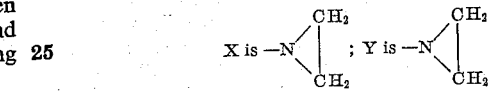

a dialklyl amine, an alkyl, an alkylene or an aryl group; M is boron, phosphorus, sulfur, arsenic, carbon, silicon, antimony or titanium. Some typical examples of compounds and polymers are:

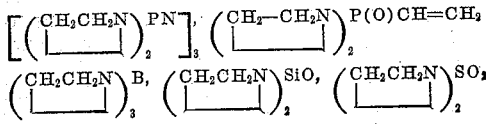

and

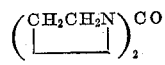

Suitable polyhydric alcohols for use in this invention include aliphatic and aromatic alcohols that contain two or more OH groups. The alcohols of the following list are typical alcohols suitable for use in this invention, but the invention is not limited to these: ethylene glycol, glycercol, 2-butene-1,4-diol, pentaerythritol, glucose, triethanolamine, diethanolamine, tris(hydroxymethyl) aminomethane, resorcinol, and phloroglucinol.

The aziridinyl compounds used in this invention also react with thio alcohols, that is, compounds that contain a —SH group. An example of a thio alcohol that reacts readily with the aziridinyl compounds described here is 1,6-hexanedithiol, $HS(CH_2)_6SH$.

Polymers provided by this invention can be produced in acidic, neutral, and alkaline conditions. They can be produced in the form of liquids or solids and can be molded by the conventional techniques of molding thermosetting resins. These polymers are valuable materials for use in production of: molded synthetic articles, such as buttons, electrical insulators and the like; synthetic coatings such as protective coatings, and paints and the like having reduced flammability; paper treating resins, textile resins; medicinal agents; lubricants; leather treating agents; insoluble starch; modification of pectic substances and the like.

The polymers provided by this invention are preferably prepared by gently heating an aziridinyl phosphine oxide or sulfide and a polyhydric alcohol until polymerization occurs. The reaction can be carried out in a solvent or in the absence of solvent. The preferred relative amounts of aziridinyl compound and alcohol used to polymerize can be calculated by conventional methods by assuming that: (1) for each aziridinyl group present in the compound, the functionality is one (e.g. if two aziridinyl groups are present, the functionality is two), (2) that the functionality of the alcoholic compound is equal to the number of OH groups present in the compound. These reactions can be carried out without catalysts or in the presence of neutral carbonates like calcium carbonate, alkali carbonates like sodium carbonate, alkali metal hydroxides, tertiary amines, and bases in general or in the presence of mineral acids. Neutral or slightly alkaline conditions are preferred.

The combustibility of organic fibrous materials can be reduced in accordance with this invention by impregnating the fibrous materials with an aqueous solution, or uniform suspension or dispersion, of the monomeric compounds, or the partially polymerized monomer formed by reacting the monomeric compounds until partial polymerization occurs and curing the impregnated materials at the temperatures conventionally used for curing fibrous organic materials.

Surface active agents, water repellents, and other textile treating agents may be incorporated into the aqueous or emulsion treating media to modify the treated textiles. Surface active softening agents improve tear strength of cotton and rayon fabrics.

The process of this invention can be used to reduce the combustibility of substantially any hydrophilic fibrous material such as cotton, rayon such as viscose rayon, ramie, jute, wool, paper, cardboard and the like materials which can be impregnated with a liquid and dried or cured.

Where a textile is being impregnated, it is of advantage to remove excess impregnating liquor by passing the textile through squeeze rolls prior to drying or curing the impregnated textile. It is also advantageous to dry the textile at about 70° to 110° C. before it is cured at a temperature of from about 100° to 170° C.

The degree of flame resistance imparted to a textile by these phosphorus and nitrogen containing resins can be varied from a low degree to a very high degree by varying the amount of polymer put in the textile.

Some advantages of flameproofing textiles in accordance with this invention are: textiles treated by this process are flame resistant, glow resistant, shrink resistant, and rot and mildew resistant; the effects of the treatment are permanent, and resistant to laundering, dry cleaning, and boiling alkali solutions; cellulosic textile materials retain a very high percentage of their tear and tensile strength.

The following examples are illustrative of details of the invention. The term "parts" or "percent" refers to parts or percent by weight. The term "APO" refers to tris(1-aziridinyl)phosphine oxide and the term "APS" refers to tris(1-aziridinyl)phosphine sulfide.

*Example 1*

*Pentaerythritol with APS.*—A white brittle polymer was prepared by heating a solution made by dissolving 25 parts of pentaerythritol in 200 parts of warm water (about 30–35° C.) then dissolving 25 parts of APS. One half of the solution was heated on a steam bath for 30 minutes then spread out into a thin layer and heated for 10 minutes at 145° C. The resulting polymer was a very light colored product that was insoluble in water and in organic solvents. It contained sulfur phosphorus and nitrogen and was highly flame resistant.

The other half of the solution prepared above, was used to pad cotton sateen fabric. The wet fabric was heated in a forced draft oven for 10 minutes at 140° C. and then removed and washed and air dried. The fabric was very strong and was flame resistant.

*Example 2*

*Ethylene glycol with APS.*—Twenty-five parts of APS were dissolved in 25 parts of ethylene glycol and then the solution was divided into equal parts—A and B. Concentrated hydrochloric acid was added to part A to reduce the pH to about 5.0; no catalysts were added to part B. Both A and B samples were then heated on the steam bath for one hour. Then a thin film of each of the viscous products was placed upon a glass surface and heated at 140° C. for 5 minutes. In both cases a clear insoluble film formed on the surface of the glass. Small portions of the film were removed and found to contain phosphorus and nitrogen and were flame resistant. The films were brittle.

*Example 3*

*Triethanolamine with APS.*—A dark brown water insoluble polymer was prepared by heating a solution containing 10 parts of triethanolamine, 10 parts of APS and 80 parts of water. The solution was first heated at 60–70° C. for 30 minutes then spread out into a thin layer and heated 5 minutes at 140° C. The polymer was extremely flame resistant.

When 10 parts of triethanolamine and 10 parts of APS were heated together, without solvent, for a few minutes at 145° C. the reaction became so vigorous that sufficient heat was produced to decompose the products that were formed.

*Example 4*

*2-amino-2-methyl-1,3-propanediol with APS.*—A solution was prepared by dissolving 30 parts of APS and 17 parts of 2-amino-2-methyl-1,3-propanediol in 188 parts of water. The pH of the solution was 10.0. A straw colored polymer formed when the solution was heated for a few minutes on the steam bath. The polymer became much harder but did not discolor when heated in an oven at 150° for 5 to 10 minutes. The polymer was highly flame resistant and contained phosphorus and nitrogen.

*Example 5*

*Tris(hydroxymethyl)aminomethane with APS.*—A solution was made by dissolving 30 parts of APS and 19 parts of tris(hydroxymethyl)aminomethane in 200 parts of water. A hard, clear polymer was produced by heating the solution on a steam bath for a few minutes. The resin became slightly more brittle when it was heated in an oven at 110° or at 170° for 5 minutes.

When a piece of cotton fabric was wet in the above aqueous solution and then dried at 70° C. and cured for 5 minutes at 150° C., the fabric became flame resistant. It remained strong with a good hand.

*Example 6*

*Ethylene glycol with APO.*—A solution was prepared containing 5 parts APO, 2.7 parts ethylene glycol and 3 parts water. Sodium carbonate was added to give a pH of 8.0 to 8.5. The solution was heated for 2.5 hours on a steam cone, allowing no water to evaporate. After standing at room temperature overnight the viscous mixture was cured for 45 minutes at 95° C. allowing the water to evaporate. A clear colorless rubbery polymer was formed. Further curing in thin films (1 to 2 mm. thick) at 145° C. for 10 minutes produced a hard, clear colorless polymer insoluble in boiling water and acetone. Films of polymer of 4 to 5 mm. thickness when heated at 145° C. decomposed with the evolution of dense white fumes.

*Example 7*

*2-butene-1,4-diol with APS.*—A clear solution was prepared by dissolving 30 parts of APS in 21 parts of warm 2-butene-1,4-diol. The solution was spread out into a thin layer (about 2 mm. thick) and then heated at 110° C. for 30 minutes to produce a clear, solid resinous product that was insoluble in water. The resinous product was heated an additional 5 minutes at 140° C. The polymer became a tough, flexible resin. It had a very light amber color. A thin sheet of this resin would burn when ignited with a match although it contained phosphorus and nitrogen.

We claim:
1. A process for producing flame resistant polymers which comprises heating a mixture of an aziridinyl compound selected from the group consisting of 1-aziridinyl phosphine oxides and sulfides and an alcohol having the formula, $R(OH)_x$, where $x$ is an integer of at least 2 and R is an alkyl radical, the proportions of alcohol and aziridinyl compound in said mixture being such that from 1 to 2 alcoholic —OH groups are present for each 1-aziridinyl group, and continuing heating until said aziridinyl compound and said alcohol have reacted with each other to produce a polymeric reaction product.

2. The process of claim 1 in which the 1-aziridinyl compound is tris (1-aziridinyl) phosphine sulfide and the alcohol is pentaerythritol.

3. The process of claim 1 in which the 1-aziridinyl compound is tris (1-aziridinyl) phosphine sulfide and the alcohol is ethylene glycol.

4. The process of claim 1 in which the 1-aziridinyl compound is tris (1-aziridinyl) phosphine sulfide and the alcohol is triethanolamine.

5. The process of claim 1 in which the 1-aziridinyl compound is tris (1-aziridinyl) phosphine sulfide and the alcohol is 2-amino-2-methyl-1,3-propanediol.

6. The process of claim 1 in which the 1-aziridinyl compound is tris (1-aziridinyl) phosphine sulfide and the alcohol is tris (hydroxymethyl) aminomethane.

7. The process of claim 1 in which the 1-aziridinyl compound is tris 1-aziridinyl) phosphine oxide and the alcohol is ethylene glycol.

8. A flame resistant polymer made by the process of claim 1.

9. A composition for rendering organic hydrophilic fibrous materials flame resistant which comprises a homogeneous liquid mixture containing an aziridinyl compound selected from the group consisting of 1-aziridinyl phosphine oxides and sulfides and an alcohol of the formula $R(OH)_x$ where $x$ is an integer of at least 2 and R is an alkyl radical, the proportions of alcohol and aziridinyl compound in said mixture being such that from 1 to 2 alcoholic —OH groups are present for each 1-aziridinyl group.

10. A composition for rendering organic hydrophilic fibrous materials flame resistant which comprises a homogeneous liquid mixture containing a partially polymerized product obtained by warming a homogeneous liquid mixture containing an aziridinyl compound selected from the group consisting of 1-aziridinyl phosphine oxides and sulfides and an alcohol of the formula $R(OH)_x$ where $x$ is an integer of at least 2 and R is an alkyl radical, the proportions of alcohol and aziridinyl compound in said mixture being such that from 1 to 2 alcoholic —OH groups are present for each 1-aziridinyl group, the warming of said mixture being continued for a time sufficient to cause said aziridinyl compound and said alcohol to react with each other to form a homogeneous liquid polymeric reaction product but not for so long a time that said polymeric reaction product has reached the solid state.

References Cited in the file of this patent

UNITED STATES PATENTS

| | | |
|---|---|---|
| 2,660,543 | Walter et al. | Nov. 26, 1948 |
| 2,582,613 | Wohnsiedler et al. | Jan. 15, 1952 |
| 2,606,901 | Parker | Aug. 12, 1952 |
| 2,654,738 | Lecher | Oct. 6, 1953 |
| 2,666,750 | Dickey et al. | Jan. 19, 1954 |
| 2,672,459 | Kuh | Mar. 16, 1954 |
| 2,682,521 | Coover | June 24, 1954 |
| 2,772,188 | Reeves et al. | Nov. 27, 1956 |

FOREIGN PATENTS

| | | |
|---|---|---|
| 854,651 | Germany | Nov. 6, 1952 |
| 863,055 | Germany | Jan. 15, 1953 |
| 888,853 | Germany | Sept. 7, 1953 |